April 23, 1935. C. W. TOWT 1,998,856
PROCESS OF PROTECTING VEGETATION
Filed Aug. 8, 1933
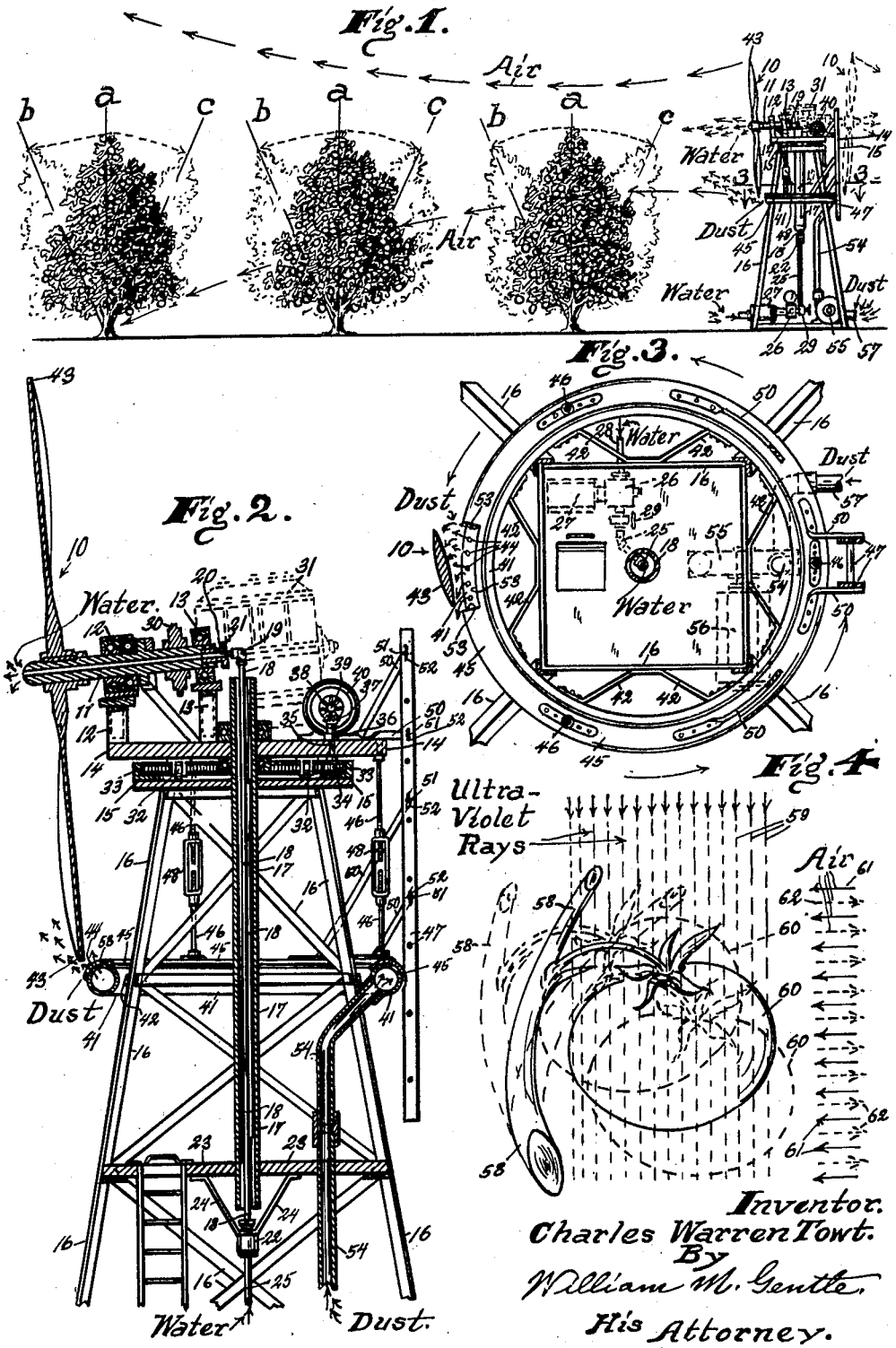
Inventor.
Charles Warren Towt.
By
William M. Gentle,
His Attorney.

Patented Apr. 23, 1935

1,998,856

UNITED STATES PATENT OFFICE 1,998,856

PROCESS OF PROTECTING VEGETATION

Charles Warren Towt, Los Angeles, Calif.

Application August 8, 1933, Serial No. 684,173

1 Claim. (Cl. 47—58)

This invention relates to a process of protecting vegetation from damage by frosting and sun-burning temperatures, and also other causes, and it is related to my prior invention on which I filed applications for United States Letters Patent for Apparatus for preventing frost damage to vegetation, and on which patents were granted March 8, 1932, No. 1,848,398 and April 11, 1933, No. 1,903,615, respectively.

One of the principal objects of this invention is to protect vegetation from excessive damage by either frosting or sun-burning temperatures, and this is accomplished by keeping the vegetation in a state of semi-violent agitation to thereby increase the flow of sap therein and also build up a resistance in the vegetation that will enable it to withstand relatively long periods of either freezing or sun-burning temperatures without material damage.

In other words my process includes causing the vegetation to sway violently to and fro to thereby alternately stretch and contract its fiber so the sap will be continually kept in motion to prevent it from clogging the circulation in exposed places where in frosting temperatures it is liable to freeze, or in high temperatures permits sun-burning for lack of plenty of moisture in the fruit and foliage.

In addition to increasing the circulation of sap, the semi-violent agitation of the vegetation develops an electrical energy therein that aids it greatly in passing uninjured through relatively long periods of frosting and freezing temperatures. The foregoing results I have determined by actual experiments in which I have kept one zone of vegetation uninjured by the treatment hereinbefore mentioned, while outside of this zone the other vegetation was greatly injured. In other words, the rubbing of the vegetable fiber either within or without the vegetation develops electrical energy, as is well known, and such energy I have found a great aid in preventing frost or sun-burning damage to vegetation.

This semi-violent agitation of the vegetation I accomplish by causing an extensive and continual varied displacement of the air over and through the vegetation that causes it to sway to and fro with considerable violence that obviously enhances the flow of sap therein, and also to build up an increased energy in the vegetation, as previously stated.

To aid in preventing frost damage to the vegetation, I charge the driven air with dust that in addition to clouding the area, also settles on the fruit and foliage as a cover, and to aid in preventing high temperatures from injuring the fruit and foliage I charge the driven air with water that prevents the sap from being evaporated. By preventing the heat from evaporating the sap, I also prevent the fruit and foliage from wilting and thereby avoid the stunting of both fruit and foliage.

In my process, if desired, I may use both the dust and water with the displaced air; and in instances of very cold and also hot temperatures, I have found it beneficial to the vegetation to simultaneously use all three of these elements.

Another object in supplying the driven air with both dust and water is to add weight thereto so it can be driven a greater distance to thereby protect the vegetation over a greater area.

Other objects, advantages and features of invention in my process may appear from the accompanying drawing, the subjoined detailed description and the appended claim.

The accompanying drawing illustrates my process, in which:

Figure 1 is a semi-diagrammatic view of an orchard illustrating how I drive the air to cause a semi-violent swaying to and fro of the trees therein to increase their resistance to either a sun-burning or frosting temperature; also diagrammatically showing a tower with a propeller thereon that I utilize in my process for agitating the vegetation and spraying it with moisture and covering it with dust.

Fig. 2 is a fragmental central vertical section through the upper portion of the tower showing how my propeller is utilized for displacing the air and distributing moisture and dust over the vegetation, with many parts indicated diagrammatically.

Fig. 3 is an enlarged cross section on the line 3—3, Fig. 1, showing a plan view of the annular dust bin and its revolving hood.

Fig. 4 is a fragmental view of a tomato vine shown in its natural position by full lines, and by dotted lines indicating it as swayed to and fro to keep the ultra-violet rays of the sun from being concentrated on its fruit and foliage, showing the alternating current of air by horizontal arrows, and also by vertical dash lines and arrows indicating the ultra-violet rays of the sun.

In my process I employ a propeller 10 that is secured to the outer end of a hollow shaft 11 that is mounted on bearings 12 and 13 that are secured on the top of a revolving platform 14. The platform 14 is rotatably mounted on the top of a stationary platform 15 that is supported by a tower 16. The tower 16 is preferably erected in an advantageous position in either an orchard or field where vegetation is to be protected from frost, sun-burn or the ravages of insects and their larvæ.

Preferably the bearings 12 and 13 are arranged so the outer end of the shaft 11 is inclined downwardly about eight degrees and its inner end is held adjacent to and above the tube 17 that is arranged centrally in the tower 16, and the platform 14 revolves around the upper end of the tube 17.

Arranged central in the tube 17 is a water-pipe 18 that is connected to the hollow shaft 11 by a pipe-fitting 19 and packing nut 20 so the shaft can revolve on the pipe extension 21, as semi-diagrammatically shown in Figs. 1 and 2.

The lower end of the pipe 18 is arranged to revolve in a water-tight box 22 that is supported under a lower platform 23 by the bracket 24. The box 22 is connected by a pipe 25 to a pump 26 that is driven by an engine 27 to draw water through pipe 28 from some source of supply not shown but well understood in the industry of spraying and irrigating vegetation.

The pipe 25 has a valve 29 that can be opened and closed as may be desired to supply water to or cut it off from the hollow shaft 11. The shaft 11 is supplied with a gear 30 that can be connected in the usual way to the shaft by an engine 31 that is shown by dotted lines in Figs. 1 and 2, and preferably these parts are constructed and arranged so the propeller 10 can be driven with great speed and power so it will displace the air over an extensive area and drive it with great force over and through the vegetation.

In addition to rotating the propeller 10 to displace the air, I also turn its shaft 11 in the path of a circle so that the direction in which the air is driven is continuously changing. This is accomplished by revolving the platform 14 on which the shaft 11 is mounted. The platform 14 is mounted centrally on the stationary platform 15 and is supported thereon by caster wheels 32.

An annular internal gear 33 is secured on the top of the platform 15 and meshing with the gear is a pinion 34 on a shaft 35 that is mounted in the bearings 36 that are secured to the platform 14. The shaft 35 has bevel gears 37 that engage a bevel gear 38 on the shaft 39 of a motor 40 that is secured on the top of the platform 14. When the motor 40 is driven it will rotate the platform 14 to turn the shaft 11 in all radial directions from the center of the tower 16.

An annular dust-bin 41 is secured by staggered arms 42 to the tower 16 so it is just behind and below the tip ends 43 of the propeller blades so that as they are revolved they will cause suction that will draw dust out of the bin 41 through the ports 44 and carry the dust up into the path of the driven air.

I provide a hood 45 that is slidably mounted on the upper portion of the stationary bin 41 so it normally covers all of the ports 44 except those that are between the tip end of the propeller blades when in their lowest position and the vertical center of the tower.

This hood 45 is connected to the platform 14 by carrier rods 46 and a ladder 47. The rods 46 have turn buckles 48 whereby a properly adjusted carrying position can be maintained between the hood 45 and the ports 44 that it covers and uncovers when revolving.

The ladder 47 is secured to the hood 48 by braces 50, and to the platform 14 by other braces 50. The braces are secured to the ladder by bolts 51 that extend through slots 52 so that a proper adjustment can be established by turn buckles 48 between the bin and hood. Many of these parts are shown diagrammatically as their detail construction is not important in this case. Also these parts are shown in detail in the application for United States Letters Patent that is filed with this case to cover its mechanical construction. This copending application was filed August 8, 1933 and has the Serial Number 684,174.

The hood 45 is cut away or slotted at 53 so it uncovers about a half dozen of the ports 44 just back of the tip ends of the propeller blades when in their lowest position of rotation; and as the propeller and hood turn in a circle in time with one another the ports 44 are successively opened by the slot 53.

Dust is supplied to the bin 41 by a pipe 54 and blower 55. The blower is driven by an engine 56 shown by dotted lines in Fig. 3. Dust from a source of supply not shown is supplied to the blower 55 by a pipe 57 fragmentally shown in Figs. 1 and 3.

From the foregoing it can be readily seen that when the engines 31 and 40 are driven the propeller will be turned in a circle around the stationary platform 15 and rotated to displace the air over an extensive area; and also when the pump engine 27 is driven and the valve 29 is opened that the water will be fed to the driven air in advance of the propeller. It is obvious that suction in advance of the propeller will aid in dispensing the water throughout the driven air, and that the air as so saturated will thereby be driven a greater distance. It is also obvious that the water can be charged with chemicals to destroy insects and their larvæ that may be present in the vegetation.

When the propeller is driven as stated and the engine 56 is driven to feed dust to the annular bin 41 by actuation of the blower 55, suction from the tip ends of the propeller 10 will draw dust from the ports 44, as described, to mix with the driven air. The dust can be chemically treated so it will destroy the various insects and their larvæ that infest orchards and fields.

In Fig. 1 three trees of an orchard are shown as swayed from lines *a* to lines *b* by the impact of the driven air from the propeller 10; and also showing the trees swayed from lines *a* to lines *c* when the propeller has moved from its full line to its dotted line position in which it is driving the air in an opposite direction. It is obvious that the circular movement of the propeller around the top of the tower will cause a cyclonical motion to the driven air which will cause the foliage of the vegetation to sway to and fro in a great number of directions so that practically all of the vegetable fiber is exercised.

In Fig. 4 I illustrate how the continuous motion of the air causes the tomato plant 58 to move to and fro so the ultra-violet rays 59 from the sun cannot be concentrated on any one spot on the tomato 60 to blister or sun-burn it. The alternating movement of the air is indicated by the horizontal arrows 61 and 62.

My process of protecting vegetation from damage by frosting, sun-burning temperatures or ravages of insects and their larvæ is used as hereinbefore fully described.

What I claim as my invention is:

Process of treating vegetation consisting of first driving moistened air over and through the vegetation sufficiently to dampen it so that dust will more readily adhere thereto, then driving a mixture of air and dust over and through the vegetation, and then, after a predetermined period of time has passed, artificially washing the dust off the vegetation.

CHARLES WARREN TOWT.